United States Patent
Hilliker et al.

(10) Patent No.: US 10,688,944 B2
(45) Date of Patent: Jun. 23, 2020

(54) INTEGRATED LIFTGATE WIRE HARNESS TETHER

(71) Applicants: John E Hilliker, Oxford, MI (US); Duane A Koehler, Livonia, MI (US)

(72) Inventors: John E Hilliker, Oxford, MI (US); Duane A Koehler, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 174 days.

(21) Appl. No.: 15/685,080

(22) Filed: Aug. 24, 2017

(65) Prior Publication Data

US 2019/0061649 A1 Feb. 28, 2019

(51) Int. Cl.
| | | |
|---|---|---|
| *E06B 7/00* | (2006.01) | |
| *B60R 16/02* | (2006.01) | |
| *B60J 5/10* | (2006.01) | |
| *H02G 3/30* | (2006.01) | |
| *H02G 3/04* | (2006.01) | |

(52) U.S. Cl.
CPC .......... *B60R 16/0215* (2013.01); *B60J 5/107* (2013.01); *B60R 16/0207* (2013.01); *H02G 3/0481* (2013.01); *H02G 3/30* (2013.01)

(58) Field of Classification Search
CPC ............ B60R 16/0222; B60R 16/0215; B60R 16/0207; H01B 5/104; H01B 5/10; H01B 5/101; H02G 3/0406; H02G 3/06; H02G 3/00; H02G 3/0462; H02G 3/0481; H02G 3/30; B60J 5/107
USPC ........ 296/146.4, 56, 146.11, 57.1; 174/72 R, 174/72 A, 72 C, 68.1, 69; 49/70
See application file for complete search history.

(56) References Cited

U.S. PATENT DOCUMENTS

| | | | | |
|---|---|---|---|---|
| 3,128,214 A | * | 4/1964 | Lay ...................... | H01B 7/0045 264/258 |
| 3,792,189 A | * | 2/1974 | Stengel ................ | H02G 3/0437 174/69 |
| 5,466,036 A | | 11/1995 | Stroeters et al. | |
| 5,730,028 A | * | 3/1998 | Maue ..................... | B60S 1/583 292/252 |
| 5,889,341 A | * | 3/1999 | Kilker ...................... | B60S 1/08 310/12.02 |
| 5,917,151 A | * | 6/1999 | O'Brien .................. | B60R 16/02 174/72 A |
| 5,924,324 A | * | 7/1999 | Kilker ..................... | F16H 19/08 15/250.3 |
| 6,575,760 B2 | * | 6/2003 | Doshita ................. | B60R 16/027 174/72 A |
| 7,922,508 B2 | * | 4/2011 | Kondas ................ | H01R 25/161 439/211 |

(Continued)

*Primary Examiner* — Chi Q Nguyen
(74) *Attorney, Agent, or Firm* — Ralph E Smith

(57) ABSTRACT

A vehicle wire harness assembly is provided that, in addition to carrying electricity to and from a vehicle closure, acts as a tether that provides structural reinforcement to the vehicle closure during a crash event. The vehicle wire harness assembly includes a wire harness having electrical wires and a sheath. The electrical wires have an electrical wire tensile strength. The wire harness includes one or more reinforcing tendons configured such that the electrical wires and the reinforcing tendon(s) have a combined tensile strength that is at least 50 percent greater than the electrical wire tensile strength. Anchors retain the wire harness to a vehicle body and a body panel closure. Each anchor has a pull-out strength of at least 50 pounds.

14 Claims, 6 Drawing Sheets

(56) References Cited

U.S. PATENT DOCUMENTS

| | | | |
|---|---|---|---|
| 8,353,993 B2 | 1/2013 | Kusakari et al. | |
| 8,624,114 B2 * | 1/2014 | Oga | B60R 16/0215 |
| | | | 174/72 A |
| 9,534,708 B2 * | 1/2017 | Cripps, II | F16L 3/222 |
| 9,928,940 B2 * | 3/2018 | Hayakawa | H01B 7/0045 |
| 10,103,529 B2 * | 10/2018 | Nagashima | B60R 16/0215 |
| 10,410,762 B2 * | 9/2019 | Hayakawa | H01B 7/295 |
| 2001/0004022 A1 * | 6/2001 | Kobayashi | B60R 16/0207 |
| | | | 174/72 A |
| 2001/0052203 A1 * | 12/2001 | Doshita | B60R 16/0215 |
| | | | 49/502 |
| 2002/0014348 A1 * | 2/2002 | Aoki | B60R 16/0215 |
| | | | 174/72 A |
| 2003/0213607 A1 * | 11/2003 | Katsumata | H02G 3/0487 |
| | | | 174/68.3 |
| 2006/0278423 A1 * | 12/2006 | Ichikawa | B60R 16/0215 |
| | | | 174/72 A |
| 2012/0298404 A1 * | 11/2012 | Tokunaga | B60R 16/0215 |
| | | | 174/135 |
| 2014/0131095 A1 * | 5/2014 | Toyama | B60R 16/0215 |
| | | | 174/72 A |
| 2016/0035461 A1 * | 2/2016 | Kumada | H01B 7/0045 |
| | | | 174/72 A |
| 2016/0322125 A1 * | 11/2016 | Kamoshida | D07B 1/147 |
| 2017/0236617 A1 * | 8/2017 | Hayakawa | H01B 7/0045 |
| | | | 174/72 A |
| 2019/0344733 A1 * | 11/2019 | Toyoshima | H02G 3/0462 |
| 2019/0385764 A1 * | 12/2019 | Hayakawa | H01B 7/0045 |

* cited by examiner

INTEGRATED LIFTGATE WIRE HARNESS TETHER

FIELD

The present disclosure generally relates to vehicle wire harness assemblies, including wire harnesses that traverse vehicle closures.

BACKGROUND

This section provides background information related to the present disclosure and is not necessarily prior art.

Vehicle wire harnesses are used to power the various electrical devices and accessories of modern vehicles. For example, wire harnesses commonly run between the vehicle body and the doors, trunk lid, and/or liftgate (i.e. closures) of the vehicle. Such wire harnesses are typically attached to the vehicle body and/or vehicle closures using plastic clips and typically include a bundle of electrical wires that are surrounded by a protective sheath. The plastic clips typically have a ridged projection that snaps into a hole in the vehicle body or vehicle closure. In the automotive industry, these plastic clips are often referred to as "Christmas tree fasteners" due to the shape of the ridged projection. The electrical wires carry electricity to electrical devices mounted to the vehicle closure such as switches, heated mirrors, powered mirror actuators, window motors, power locks/latches, courtesy lights, tail lights, brake lights, reverse lights, heated glass, rear view cameras, and window wiper motors. Traditionally, such vehicle wire harnesses have been used for no other purpose besides carrying electricity to and from the vehicle closures.

SUMMARY

This section provides a general summary of the disclosure and is not a comprehensive disclosure of its full scope or all of its features.

In accordance with one aspect of the subject disclosure, a vehicle wire harness assembly is provided that, in addition to carrying electricity to and from a vehicle closure, acts as a tether that provides structural reinforcement to the vehicle closure during a crash event. The vehicle wire harness assembly includes a wire harness having one or more electrical wires and a sheath that covers and protects the electrical wire(s). The electrical wire(s) of the wire harness have an electrical wire tensile strength. The wire harness further includes one or more reinforcing tendons configured such that the electrical wire(s) and the reinforcing tendon(s) have a combined tensile strength that is at least 50 percent greater than the electrical wire tensile strength so that the wire harness acts as a tether during a crash event.

In accordance with another aspect of the subject disclosure, a vehicle closure assembly is provided that includes a vehicle body, a body panel closure, and a wire harness. The vehicle body has an opening. The body panel closure is pivotally mounted on the vehicle body for movement between an open position and a closed position. The body panel closure closes the opening in the vehicle body in the closed position. The wire harness extends between the vehicle body and the body panel closure. A plurality of anchors retain the wire harness to the vehicle body and the body panel closure. Each anchor has a pull-out strength of at least 50 pounds to enable the wire harness to act as a tether during a crash event.

Advantageously, the wire harness functions as a tether during a crash event and prevents the body panel closure from becoming detached from the vehicle body and/or prevents fractured pieces of the body panel closure from becoming separated from the rest of the body panel closure or otherwise detached from the vehicle. This improves the structural integrity of the body panel closure and the overall safety of the vehicle during a crash without adding additional safety components to the vehicle. It also provides greater flexibility in material selection for and the design of body panel closures, which can result in lighter weight body panel closures for improved vehicle performance, efficiency, cost-savings, and/or longevity.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
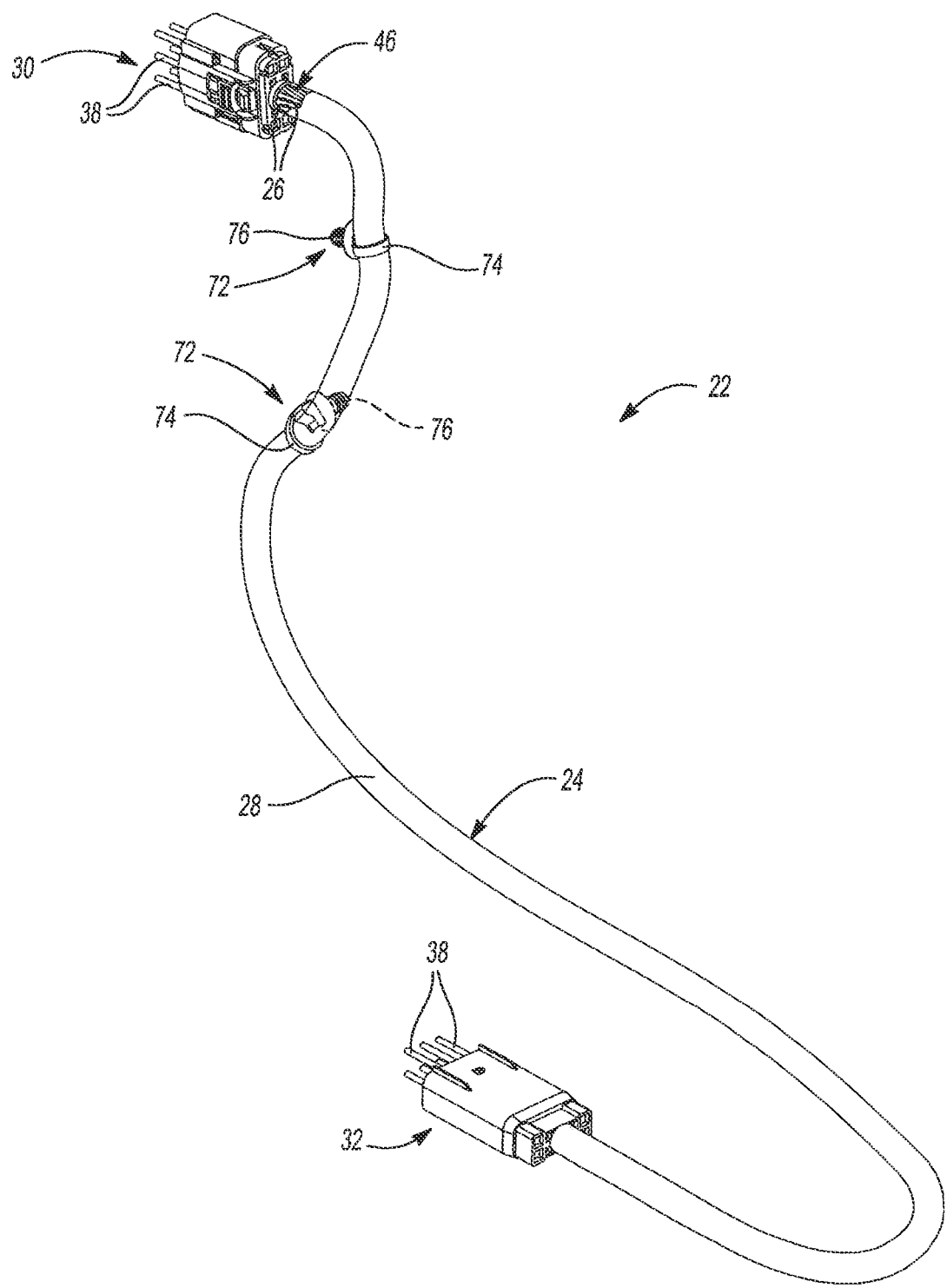
FIG. 1 is a front perspective view of an exemplary vehicle wire harness assembly that is constructed in accordance with the subject disclosure.

Referring to the Figures, wherein like numerals indicate corresponding parts throughout the several views, a vehicle closure assembly 20 and a vehicle wire harness assembly 22 are illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
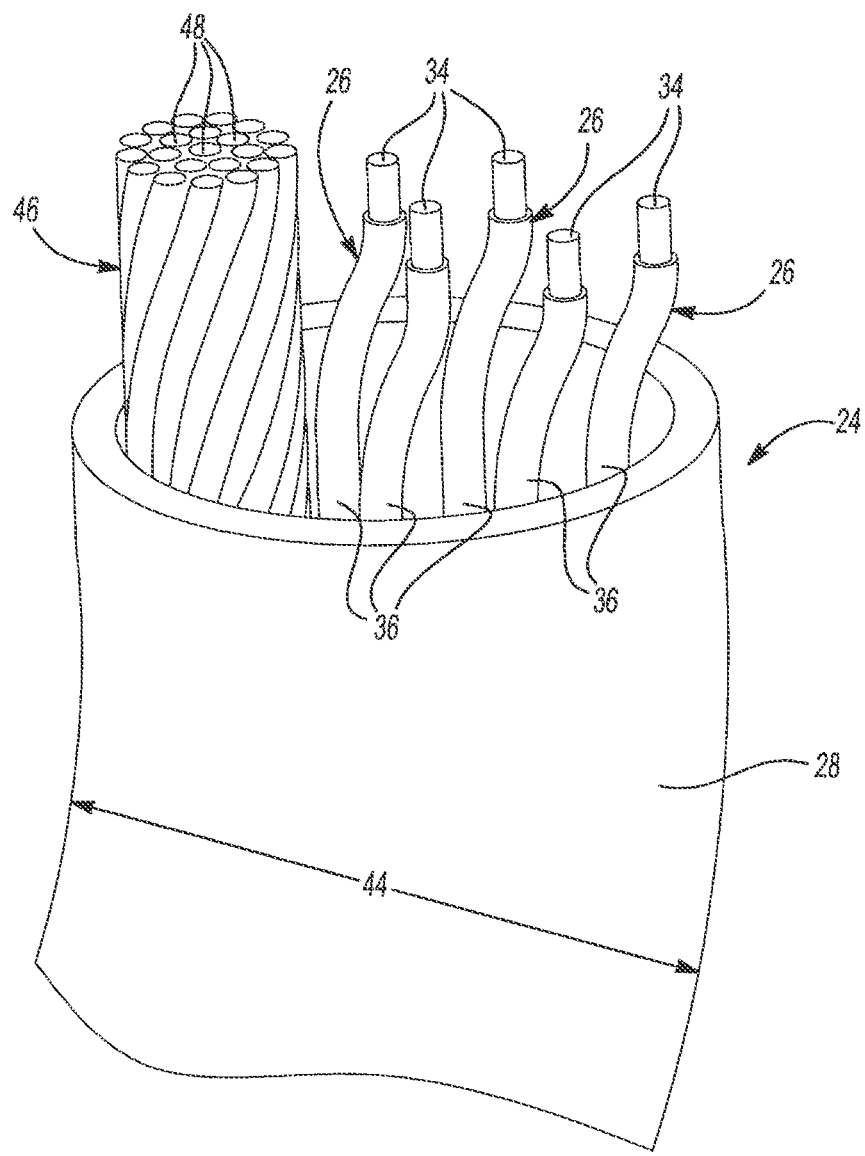
FIG. 2 is an enlarged perspective cut-away view of the exemplary vehicle wire harness assembly illustrated in FIG. 1 showing electrical wires and an exemplary reinforcing tendon.

With reference to FIGS. 1 and 2, a wire harness 24 of the vehicle wire harness assembly 22 is illustrated. The wire harness 24 includes one or more electrical wires 26 and a sheath 28 that covers and protects the electrical wire(s) 26. The electrical wire(s) 26 extend between a first terminal end 30 and a second terminal end 32. Each electrical wire 26 is made of an electrically conductive material 34 and an insulator 36 that extends around and protects the electrically conductive material 34. In one non-limiting example, the electrical wire(s) 26 are made of copper and the insulator 36 are made of plastic or rubber. Each of the first and second terminal ends 30, 32 includes one or more electrical contacts 38. Although various configurations of the first and second terminal ends 30, 32 are possible, by way of example and without limitation, the electrical contacts 38 of the first and second terminal ends 30, 32 are be provided in the form of metal pins that are configured to plug into a female socket interface (not shown). Obviously, this configuration could be reversed, where the electrical contacts 38 of the first and/or second terminal ends 30, 32 are provided as the female socket interface. The electrically conductive material 34 of the electrical wire(s) 26 is electrically connected to the electrical contacts 38 of the first and second terminal ends 30, 32.

Figure 5:
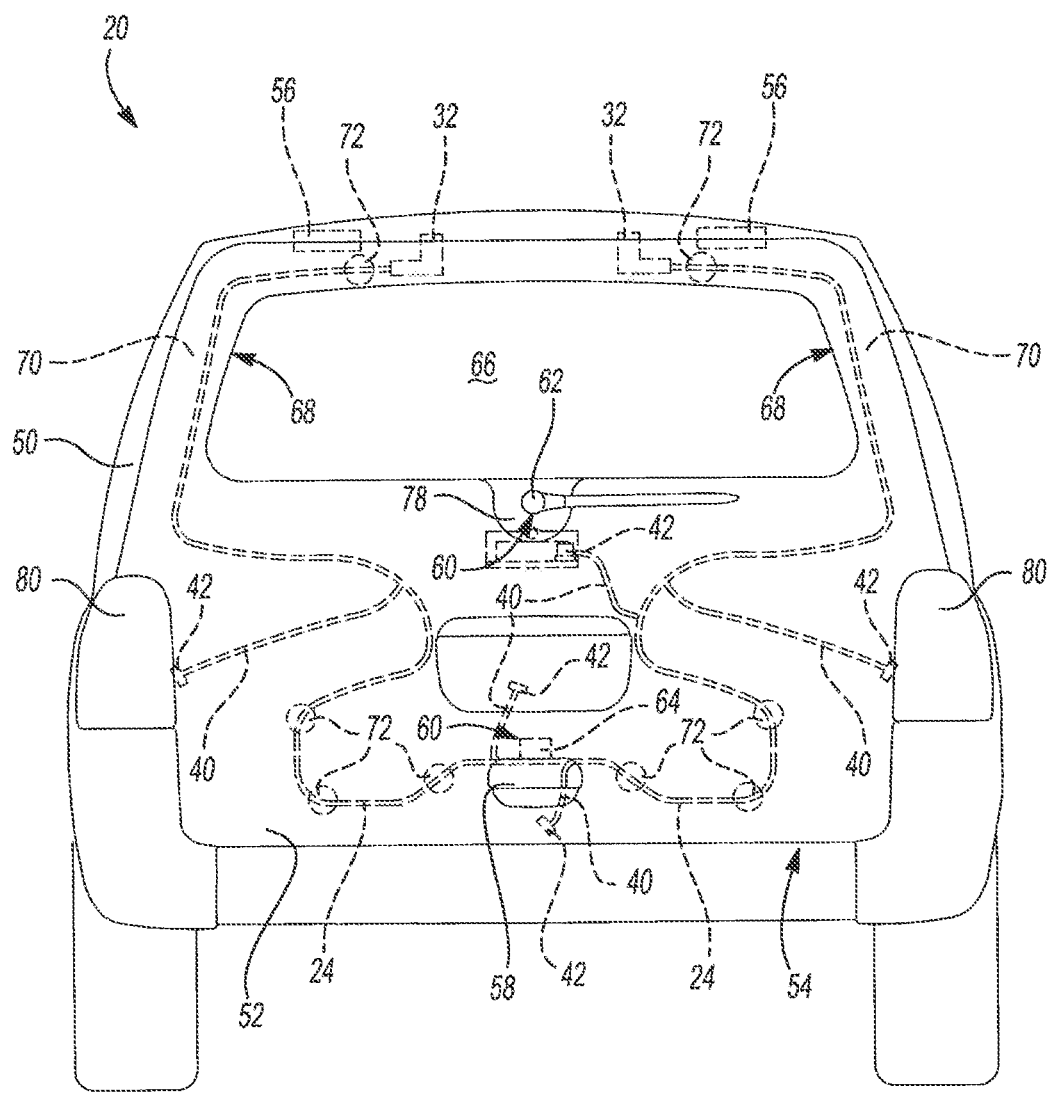
FIG. 5 is a rear elevation view of another exemplary vehicle closure assembly that is constructed in accordance with the subject disclosure.

While the subject disclosure envisions a wire harness 24 that includes a single electrical wire 26, in many applications, the wire harness 24 will include a plurality of electrical wires 26. In the later configuration, the plurality of electrical wires 26 form a bundle of wires that is disposed inside the sheath 28 of the wire harness 24. As shown in FIG. 5, the wire harness 24 includes one or more branches 40 where each branch 40 presents an additional terminal end 42. Referring again to FIG. 2, the wire harness 24 has a total thickness 44 (e.g. outer diameter) that is measured across the sheath 28 surrounding the electrical wires 26. In one configuration, the total thickness 44 of the wire harness 24 is constant along its length (i.e. between the first and second terminal ends 30, 32). In other configurations, the total thickness 44 of the wire harness 24 varies along its length, for example, in configurations where the wire harness 24 includes one or more branches 40 (FIG. 5).

The electrical wire(s) 26 of the wire harness 24 have an electrical wire tensile strength that is measured in pounds (lbs). In configurations where the wire harness 24 includes only a single electrical wire 26, the electrical wire tensile strength equals the tensile strength of the single electrical wire 26. In configurations where the wire harness 24 includes a plurality of electrical wires 26, the electrical wire tensile strength equals the sum of all of the tensile strengths of the individual electrical wires 26 in the plurality of electrical wires 26 (i.e. the bundle of electrical wires 26). In one non-limiting embodiment, the electrical wire tensile strength of the electrical wire(s) 26 is less than 600 pounds (lbs). By way of example only and without limitation, the tensile strength of an individual electrical wire 26 of the wire harness 24 ranges from 35 to 38 pounds (lbs). In keeping with this example, the wire harness 24 includes 8 to 16 individual electrical wires 26 such that the electrical wire tensile strength of the wire harness 24 ranges from 350 to 570 pounds (lbs). These values are provided as examples only and are not intended to limit the subject application in any way.

With reference to FIGS. 1 and 2, the wire harness 24 also includes one or more reinforcing tendons 46. The reinforcing tendon(s) 46 significantly increase the tensile strength of the wire harness 24 due to the material selection and configuration of the reinforcing tendon(s) 46 so that the wire harness 24 acts as a tether during a crash event. Specifically, the reinforcing tendon(s) 46 are configured such that the one or more electrical wire(s) 26 and the one or more reinforcing tendon(s) 46 have a combined tensile strength, measured in pounds (lbs), that is at least 50 percent (%) greater than the electrical wire tensile strength of the one or more electrical wire(s) 26 alone. In configurations where the wire harness 24 includes only a single electrical wire 26 and a single reinforcing tendon 46, the combined tensile strength equals the sum of the tensile strength of the single electrical wire 26 and the tensile strength of the single reinforcing tendon 46. In configurations where the wire harness 24 includes a plurality of electrical wires 26 and a single reinforcing tendon 46, the combined tensile strength equals the sum of all of the tensile strengths of the individual electrical wires 26 in the plurality of electrical wires 26 (i.e. the bundle of electrical wires 26) and the tensile strength of the single reinforcing tendon 46. In configurations where the wire harness 24 includes only a single electrical wire 26 and a plurality of reinforcing tendons 46, the combined tensile strength equals the sum of the tensile strength of the single electrical wire 26 and the sum of all of the tensile strengths of the individual reinforcing tendons 46 in the plurality of reinforcing tendons 46. In configurations where the wire harness 24 includes a plurality of electrical wires 26 and a plurality of reinforcing tendons 46, the combined tensile strength equals the sum of all of the tensile strengths of the individual electrical wires 26 in the plurality of electrical wires 26 (i.e. the bundle of electrical wires 26) and the sum of all of the tensile strengths of the individual reinforcing tendons 46 in the plurality of reinforcing tendons 46.

The reinforcing tendon(s) 46 increase the strength density of the wire harness 24. The reinforcing tendon(s) 46 have a variety of different configurations and may be made of a variety of different materials without departing from the scope of the subject disclosure. In one non-limiting example, the reinforcing tendon(s) 46 include a plurality of reinforcing strands 48 that run in a lengthwise direction of the wire harness 24 from the first terminal end 30 to the second terminal end 32. By way of example and without limitation, the reinforcing tendon(s) 46 are made from steel, para-aramid synthetic fiber (e.g. Kevlar®), polyester, fiberglass, or combinations thereof. In one non-limiting example, the combined tensile strength of the electrical wire(s) 26 and the reinforcing tendon(s) 46 is greater than 900 pounds (lbs) and the reinforcing tendon(s) 46 have a reinforcing tendon tensile strength of at least 300 pounds (lbs). By way of example only and without limitation, the reinforcing tendon 46 is made of fiberglass and has a reinforcing tendon tensile strength of approximately 400 pounds (lbs). These values are provided as examples only and are not intended to limit the subject application in any way unless they are expressly incorporated into the claims.

In the example illustrated in FIG. 2, the reinforcing tendon 46 is disposed within the sheath 28 adjacent to the electrical wires 26. In this non-limiting example, the sheath 28 is made of a plastic tube or a rubber tube. In another non-limiting example, the sheath 28 is made of a tape that is wound around the electrical wires 26 and the reinforcing tendon 46 in an overlapping, helical fashion such that the reinforcing tendon 46 is "taped into" the vehicle wire harness assembly 22. In other alternative configurations, the reinforcing tendon(s) 46 are external to or integrated with (e.g. imbedded in) the sheath 28 of the vehicle wire harness assembly 22. Regardless of the configuration, the reinforcing tendon(s) 46 are electrically separated (e.g. disconnected) from the electrical contacts 38 of the first and second terminal ends 30, 32 such that the reinforcing tendon(s) 46 do not carry electricity through the vehicle wire harness assembly 22.

With additional reference to FIGS. 3-6, the vehicle wire harness assembly 22 extends between a vehicle body 50 and a body panel closure 52 of the vehicle closure assembly 20. The vehicle body 50 defines an opening 54 that provides access to a vehicle interior. To list a few non-limiting examples, the opening 54 is a side door opening, a rear liftgate opening, or a trunk opening. The body panel closure 52 is pivotally mounted on the vehicle body 50 by one or more hinge connections 56 that allow the body panel closure 52 to move relative to the vehicle body 50 between an open position and a closed position. In the closed position (illustrated), the body panel closure 52 closes the opening 54 in the vehicle body 50. In the open position (not shown), the body panel closure 52 allows access to the vehicle interior, such as for passenger ingress of egress. The body panel closure 52 is, for example, a vehicle door, a vehicle liftgate, or a trunk lid. A latch 58 releasably couples the body panel closure 52 to the vehicle body 50 for holding the body panel closure 52 in the closed position. Release/actuation of the latch 58 frees the body panel closure 52 and enables it to pivot away from the opening 54 in the vehicle body 50.

One or more electrical devices 60 are attached to the body panel closure 52. By way of example and without limitation, the electrical device(s) 60 are: locking mechanisms, latching mechanisms, switches, heated mirrors, powered mirror actuators, window motors, courtesy lights, tail lights, brake lights, reverse lights, heated glass, rear view cameras, and window wiper motors. The electrical wire(s) 26 of the wire harness 24 are electrically connected to the electrical device(s) 60 and therefore carry electricity to the electrical device(s) 60.

In FIGS. 3-6, the body panel closure 52 illustrated is a vehicle liftgate with a window wiper motor 62 and a locking mechanism 64 as electrical devices 60. In the illustrated example, the body panel closure 52 includes a window aperture 66 for receiving a vehicle window and hollow segments 68 that define cavities 70 within the body panel closure 52. A plurality of anchors 72 retain the wire harness 24 to the vehicle body 50 and the body panel closure 52. Each of the plurality of anchors 72 has a pull-out strength of at least 50 pounds (lbs). It will be appreciated in the relevant art that this pull-out strength is well above that of a standard plastic "Christmas tree" fastener. In the example illustrated in FIG. 1, each anchor 72 includes a metal clip 74 and a metal fastener 76. The metal fastener 76 of the anchor 72 extends into either the vehicle body 50 or the body panel closure 52 to retain the metal clip 74 of the anchor 72 on the vehicle body 50 or the body panel closure 52. The metal clip 74 extends around the sheath 28 of the wire harness 24 and therefore holds the wire harness 24 on the vehicle body 50 or the body panel closure 52. By way of example and without limitation, the metal fastener 76 is a screw, bolt, or rivet. The pull-out strength of the anchor 72 is measured in-plane with the fastener 76 and equals the amount of force required to pull the fastener 76 away from the vehicle body 50 or body panel closure 52 or otherwise break the material of the anchor 72.

It should be appreciated that the anchors 72 are useable in combination with a wire harness 24 that is provided with or without the reinforcing tendon(s) 46. When the anchors 72 are used in combination with a wire harness 24 that does not have any reinforcing tendons 46, the electrical wire(s) 26 and sheath 28 alone provide the tensile strength of the wire harness 24 that resists separation of the body panel closure 52, or pieces thereof, from the vehicle body 50. Each particular configuration of the vehicle wire harness assembly 22 is dictated by the number of electrical devices 60 the wire harness 24 needs to power, packaging constraints, and the maximum load requirements the vehicle wire harness assembly 22 is designed to endure during a crash event. In one non-limiting example, the maximum load requirement is at least 2,600 Newtons (N) or approximately 858 pounds (lbs). The number, type, and material of the reinforcing tendon(s) 46 and/or anchors 72 required will vary depending upon these design considerations.

Figure 3:
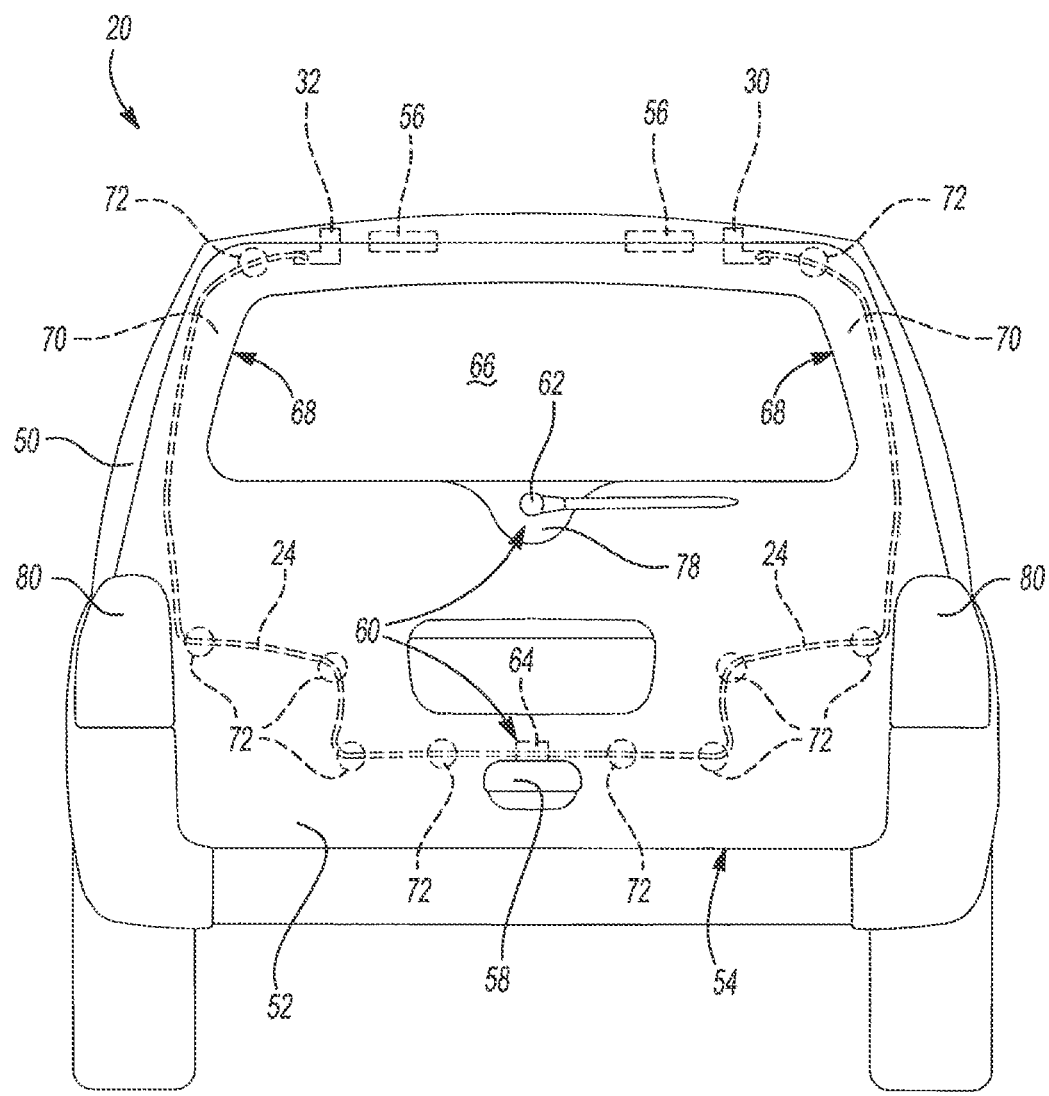
FIG. 3 is a rear elevation view of an exemplary vehicle closure assembly that is constructed in accordance with the subject disclosure.
Figure 4:
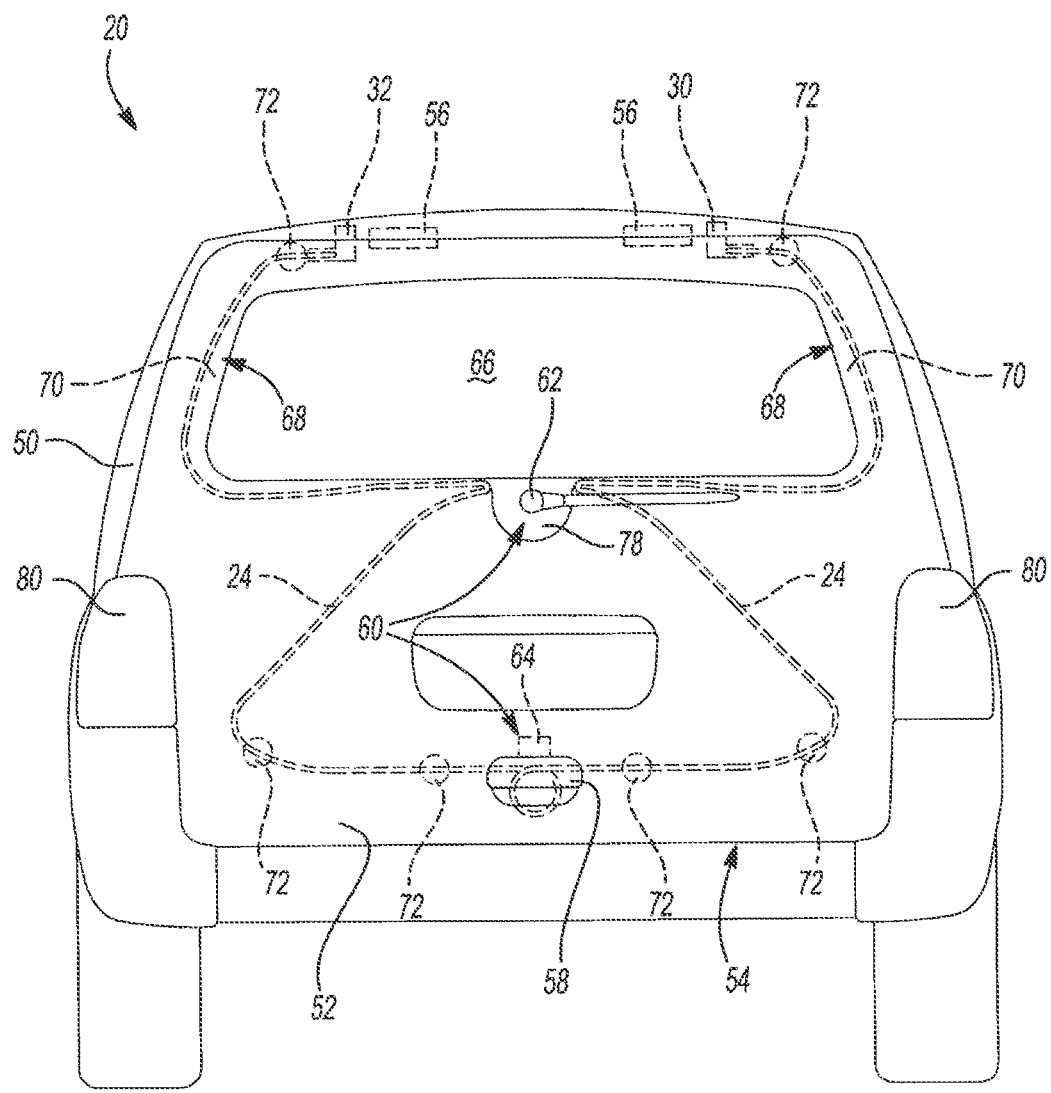
FIG. 4 is a rear elevation view of another exemplary vehicle closure assembly that is constructed in accordance with the subject disclosure.
Figure 6:
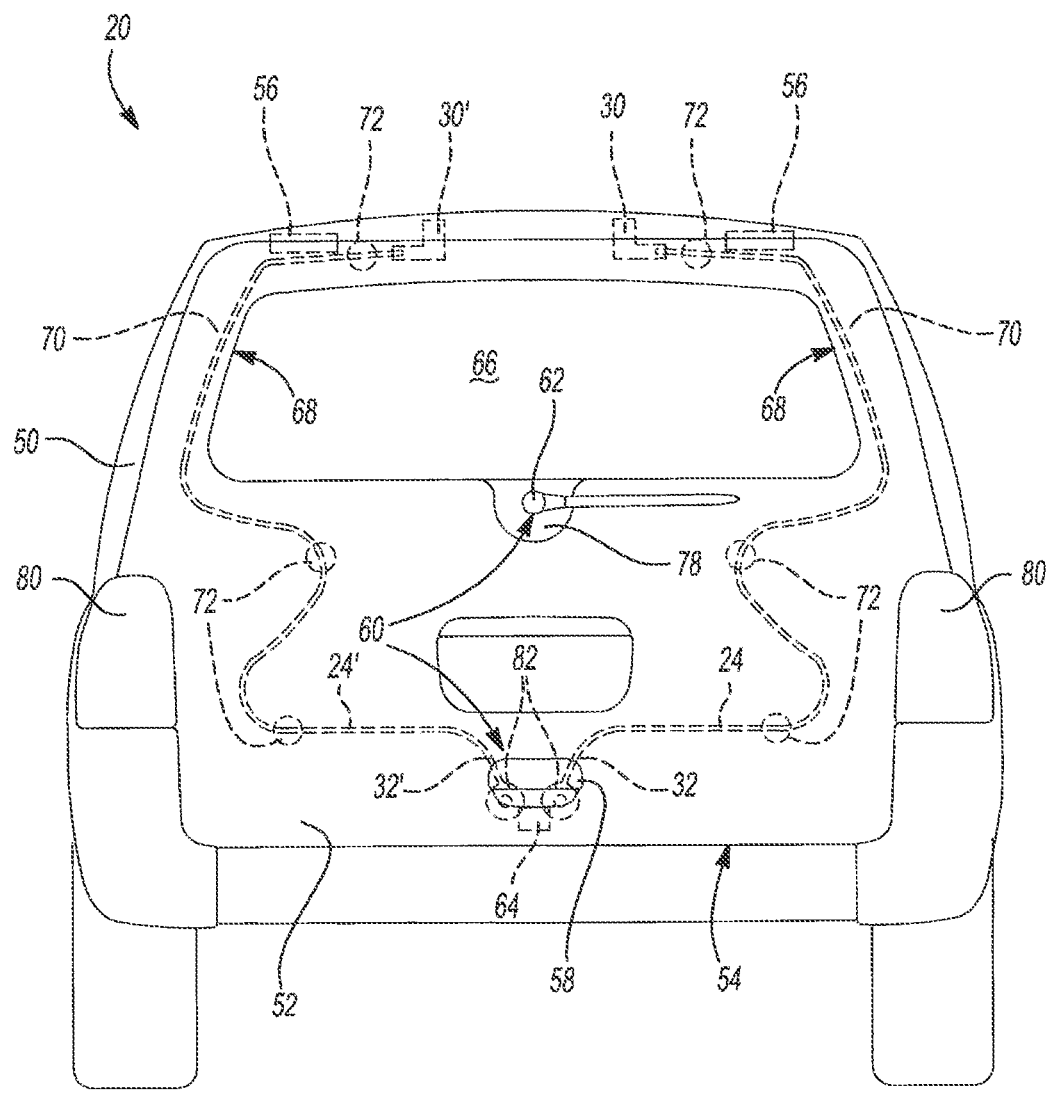
FIG. 6 is a rear elevation view of another exemplary vehicle closure assembly that is constructed in accordance with the subject disclosure.

The wire harness 24 is secured to the vehicle body 50 closure at a number of different attachment points. With reference to FIG. 3, the wire harness 24 runs along the body panel closure 52 on opposing sides of the window aperture 66 and is secured to the latch 58. At least a portion of the wire harness 24 extends through the cavities 70 in the hollow segments 68 of the body panel closure 52 and the ends 30, 32 are secured to the vehicle body 50. FIG. 4 illustrates an adaptation where the wire harness 24 is also secured to a wiper bracket 78 of the body panel closure 52 to which the window wiper motor 62 is mounted. FIG. 5 illustrates another adaptation where the wire harness 24 is secured to the body panel closure 52 with a plurality of anchors 72 and the branches 40 of the wire harness 24 run to the window wiper motor 62, tail lights 80, and locking mechanism 64. FIG. 6 illustrates an alternative embodiment that includes two wire harnesses 24, 24' that run along opposing sides of the window aperture 66 and have ends 30, 30' that are secured to the vehicle body 50 and ends 32, 32' that are secured to the latch 58. In accordance with these embodiments, the wire harness 24 is secured to the latch 58 and/or the wiper bracket 78 in a number of ways. The following are some non-exhaustive examples. In FIG. 4, the wire harness 24 itself is looped through portions of the latch 58 or wiper bracket 78. Alternatively, the wire harness 24 in FIG. 6 includes one or more couplings 82 that engage the latch 58 or wiper bracket 78. By way of example and without limitation, the couplings 82 are constructed similarly to carabiners, D-rings, or seat belt buckles.

During a crash event, such as a rear impact, the vehicle body 50 and/or body panel closure 52 may undergo rapid acceleration, deceleration, and/or shock. During this rapid acceleration, deceleration, and/or shock, it is important for closure of the opening 54 in the vehicle body 50 to be maintained. In the event the hinge connections 56 and/or latch 58 fail as the result of a crash, or in the event the body panel closure 52 itself fractures into multiple pieces as the result of a crash, the vehicle wire harness assembly 22 of the subject disclosure advantageously functions as a tether and prevents the body panel closure 52 from becoming detached from the vehicle body 50 and/or prevents fractured pieces of the body panel closure 52 from becoming separated from the rest of the body panel closure 52 or otherwise detached from the vehicle. This improves the structural integrity of the body panel closure 52 and the overall safety of the vehicle during a crash without adding additional safety components to the vehicle. It also provides greater flexibility in material selection for, and the design of, body panel closures 52, which can result in cost-savings, improved longevity, and lighter weight body panel closures 52 for improved vehicle performance and efficiency. For example, the vehicle wire harness assembly 22 disclosed herein is particularly well suited for use with body panel closures 52 that are made from a material other than steel, which may have a modulus of elasticity that is less than the modulus of elasticity for steel (i.e. materials that are more brittle than steel).

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A vehicle wire harness assembly comprising:
a wire harness including at least one electrical wire and a sheath that covers and protects said at least one electrical wire;
said at least one electrical wire of said wire harness extending between first and second terminal ends and having an electrical wire tensile strength;
each of said first and second terminal ends including at least one electrical contact; and
said wire harness including at least one reinforcing tendon configured such that said at least one electrical wire and said at least one reinforcing tendon have a combined tensile strength that is at least 50 percent greater than said electrical wire tensile strength so that said wire harness acts as a tether during a crash event, wherein said at least one reinforcing tendon is electrically separated from said electrical contacts of said first and second terminal ends.

2. The vehicle wire harness assembly as set forth in claim 1 wherein said at least one electrical wire is made of an electrically conductive material and an insulator that extends around and protects said electrically conductive material, said electrically conductive material of said at least one electrical wire being electrically connected to said electrical contacts of said first and second terminal ends.

3. The vehicle wire harness assembly as set forth in claim 1 wherein said at least one reinforcing tendon does not carry electricity through said wire harness.

4. The vehicle wire harness assembly as set forth in claim 1 wherein said at least one reinforcing tendon is disposed within said sheath adjacent to said at least one electrical wire.

5. The vehicle wire harness assembly as set forth in claim 1 wherein said at least one reinforcing tendon is made of a plurality of reinforcing strands.

6. The vehicle wire harness assembly as set forth in claim 1 wherein said at least one reinforcing tendon has a reinforcing tendon tensile strength of at least 300 pounds.

7. The vehicle wire harness assembly as set forth in claim 1 wherein said at least one reinforcing tendon is made from one of steel, para-aramid synthetic fiber, polyester, and fiberglass.

8. The vehicle wire harness assembly as set forth in claim 1 wherein said at least one electrical wire is a plurality of electrical wires that form a bundle of wires disposed inside said sheath of said wire harness.

9. The vehicle wire harness assembly as set forth in claim 1, further comprising:
a plurality of anchors that are configured to retain said wire harness to a vehicle body or a body panel closure, each of said plurality of anchors having a pull-out strength of at least 50 pounds.

10. A vehicle closure assembly comprising:
a vehicle body defining an opening;
a body panel closure pivotally mounted on said vehicle body for movement between an open position and a closed position where said body panel closure closes said opening in said vehicle body;
a wire harness extending between said vehicle body and said body panel closure; and
a plurality of anchors that retain said wire harness to said vehicle body and said body panel closure, each of said plurality of anchors having a pull-out strength of at least 50 pounds to enable said wire harness to act as a tether during a crash event.

11. The vehicle closure assembly as set forth in claim 10, further comprising:
a latch releasably coupling said body panel closure to said vehicle body for holding said body panel closure in said closed position.

12. The vehicle closure assembly as set forth in claim 11 wherein said body panel closure includes a window aperture for receiving a vehicle window and at least one hollow segment that defines at least one cavity within said body panel closure, wherein said wire harness is secured to said latch, wherein said wire harness extends from said vehicle body and runs along said body panel closure on opposing sides of said window aperture, and wherein at least a portion of said wire harness extends through said at least one cavity in said at least one hollow segment of said body panel closure.

13. The vehicle closure assembly as set forth in claim 10 wherein each of said plurality of anchors includes a metal clip and a metal fastener that extends into one of said vehicle body and said body panel closure to retain said metal clip on one of said vehicle body and said body panel closure.

14. The vehicle closure assembly as set forth in claim 10 wherein said body panel closure is a vehicle liftgate, wherein said body panel closure has at least one electrical device being at least one of a locking mechanism, a latching mechanism, heated glass, a window wiper motor, a rear view camera, a tail light, and a courtesy light, and wherein said wire harness includes at least one electrical wire that is electrically connected to said at least one electrical device.

* * * * *